United States Patent [19]

Nariki et al.

[11] Patent Number: 4,830,169
[45] Date of Patent: May 16, 1989

[54] DEVICE FOR FEEDING CAN BARRELS

[75] Inventors: Hiroshi Nariki, Tatebayashi; Haruyki Yuri, Kazo; Isao Ibane, Tatebayashi, all of Japan

[73] Assignee: Hokkai Can Co., Ltd., Tokyo, Japan

[21] Appl. No.: 109,311

[22] Filed: Oct. 19, 1987

[30] Foreign Application Priority Data

Oct. 20, 1986 [JP] Japan .......................... 61-159534[U]

[51] Int. Cl.4 ............................................. B65G 47/00
[52] U.S. Cl. .................................... 198/345; 198/377; 198/471.1; 118/319
[58] Field of Search ...................... 198/344, 345, 463.4, 198/463.6, 471.1, 472.1, 377, 378, 531, 532; 118/46, 230, 319; 101/38 A, 44

[56] References Cited

U.S. PATENT DOCUMENTS 2,818,159 12/1957 Yeo et al. .............................. 198/378
3,267,842 8/1966 Resnick et al. .................... 101/38 A
3,362,520 1/1968 Rudolph et al. ...................... 198/378
4,240,373 12/1980 Anger ................................. 118/319
4,246,300 1/1981 Jensen ................................. 198/344

Primary Examiner—Joseph E. Valenza
Attorney, Agent, or Firm—Birch, Stewart, Kolasch & Birch

[57] ABSTRACT

A plurality of rotatable attracting units are mounted on a rotary member each for attracting the bottom of one of the can barrels supplied from a supply path in a first position. Each attracting unit is inactivatable to release the one can barrel onto a conveyor path in a second position after the one can barrel has been rotated by the rotary member through a prescribed angle from the first position to the second position. A holder is disposed in the first position for holding the can barrels, one at a time, supplied from the supply path while centrally aligning the bottom of the can barrel with the center of rotation of the attracting unit in the first position. The attracting unit is stopped by a retarder against rotation about its own axis when the attracting unit is moved into the first position and attracts the can barrel held by the holder.

7 Claims, 5 Drawing Sheets

DEVICE FOR FEEDING CAN BARRELS

BACKGROUND OF THE INVENTION

1. Field of the Invention

The present invention relates to a device for feeding can barrels such as bottomed can barrels for can containers with their axes lying horizontally while rotating them through a prescribed angle.

2. Description of the Prior Art

One known device for feeding can barrels is disclosed in U.S. Pat. No 4,246,300, for example.

As shown in FIGS. 7 and 8 of the accompanying drawings, can barrels a for can containers are supplied with their axes lying horizontally from a vertical supply path b into receiver slots d defined by a star wheel c as it rotates. The supplied can barrels a have their bottoms g attracted by respective attracting rollers f which are rotated by an endless belt e disposed behind the star wheel c and having suction holes f1 coupled to a suction device (not shown). Upon rotation of the start wheel c, the can barrels a held horizontally by the attracting rollers f are successively angularly moved through a prescribed angle while being rotated about their own axes by the rotation of the attracting rollers f about their own axes. At each position S of the angular movement, paint is sprayed into the can barrel a to apply a paint coating to its inner surfaces. Then, the painted can barrel a is further rotated through a certain angle, and then released from the attracting roller f onto a feed conveyor h by which the can barrel a is delivered into a drying oven device (not shown) in which the applied paint coating is dried with heat.

When the bottom of the can barrel a is attracted to the attracting roller f, it is necessary to align the center of rotation of the attracting roller f with the center of the bottom of the can barrel a. If the centers are not properly aligned with each other, the can barrel a attracted to the attracting roller f would be rotated in an eccentric condition. For centering the can barrels a, the conventional device has a side guide j having a guide surface m extending in concentric relation to the star wheel c which holds the can barrels a. The can barrel a can not be accurately centered with respect to the attracting roller f if the can barrel a is attracted to the attracting roller f during the process of aligning the center of the bottom of the can barrel a with the center of rotation of the attracting roller f. Therefore, the can barrel a is attracted to the attracting roller f only after the can barrel a is centered at the time it is held and rotated by the star wheel c at the terminal end of the supply path b. It is also proposed to provide the attracting roller f with a centering boss for fitting in a recess in the bottom of the can barrel a and to provide a top guide 1 for engaging the open end k of the can barrel a.

With the disclosed conventional arrangement, the attracting roller f is rotating about its own axis when the can barrel a is supplied from the supply path b into the receiver slot d of the rotating star wheel c, centered with respect to the attracting roller f and attracted thereto. Therefore, before the bottom g of the can barrel a which is not rotated is attracted to the attracting roller f at a prescribed position thereon, the can barrel a may wobble out of centered alignment into a twisted shape. The can barrel a is centered while being gripped between the star wheel c and the side guide j. Consequently, when the can barrel a is rotated by the rotation of the attracting roller f about its own axis, the can barrel a tends to be damaged since its side i is held against the receiver slot d and the side guide j The can barrel a is also gripped between the attracting roller f and the top guide 1 with the open end k of the can barrel a being in contact with the top guide 1. Therefore, upon rotation of the can barrel a caused by the attracting roller f about its own axis, the open end k tends to be deformed by pressed engagement with the top guide 1. If the side i of the can barrel a is damaged, the can barrel a has a poor appearance. If the open end k is deformed, it cannot smoothly be flanged at a later time.

SUMMARY OF THE INVENTION

In view of the aforesaid shortcomings of the conventional can barrel feeding device, it is an object of the present invention to provide a device for feeding can barrels quickly and reliably while rotating them with their axes lying horizontally, without damaging the sides and open ends thereof.

Another object of the present invention is to provide a device for feeding can barrels while rotating them with their axes lying horizontally, to a painting device for applying a paint coating to the inner surfaces of the can barrels.

To achieve the above objects, there is provided a device for feeding can barrels, comprising a rotary member rotatable about its own axis. A plurality of rotatable attracting units are mounted on the rotary member each for attracting the bottom of one of the can barrels supplied from a supply path in a first position. Each of the attracting units is inactivatable to release the one can barrel onto a conveyor path in a second position after the one can barrel has been rotated by the rotary member through a prescribed angle from the first position to the second position. A holder is disposed in the first position for holding the can barrels, one at a time, supplied from the supply path while centrally aligning the bottom of the can barrel with the center of rotation of the attracting unit in the first position. A stopper is provided for stopping the attracting unit against rotation about its own axis when the attracting unit is moved into the first position and attracts the can barre held by the holder.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
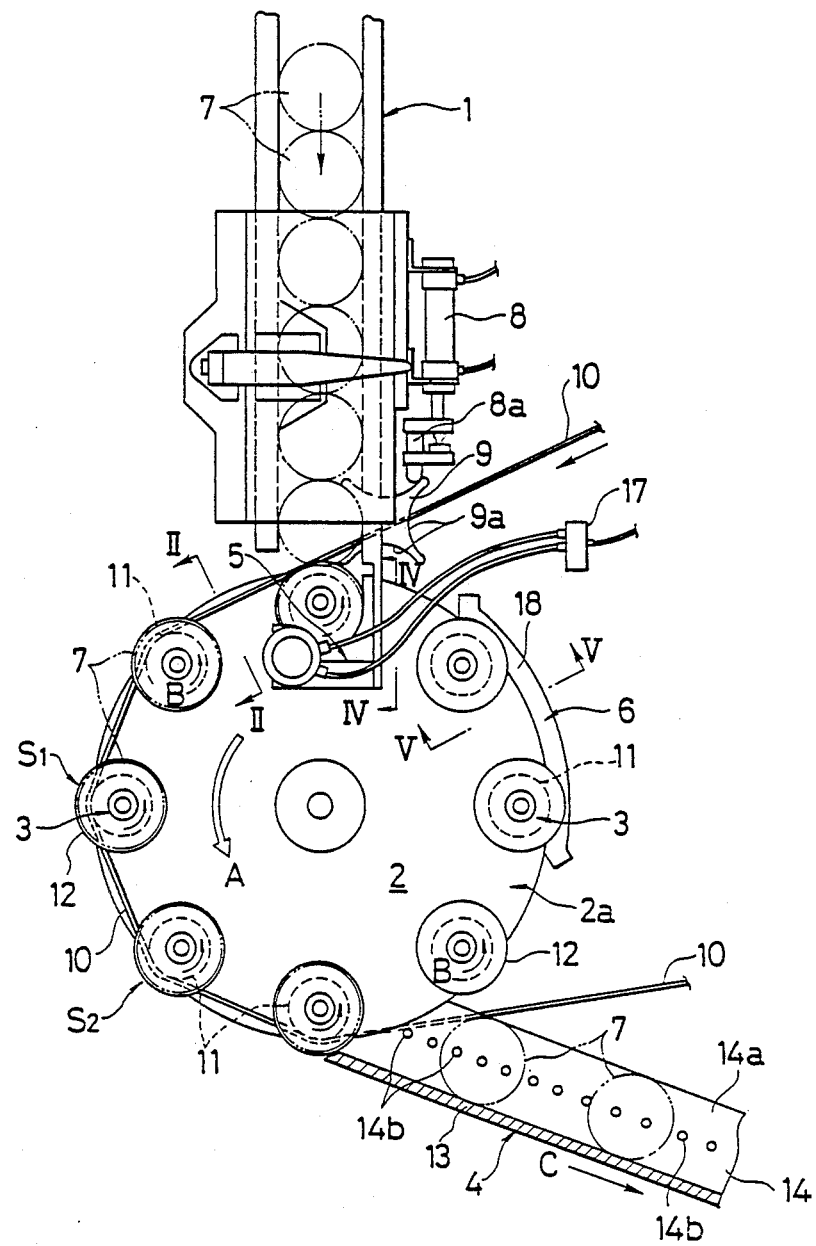
FIG. 1 is a front elevational view of a can barrel feeding device according to the present invention.

FIGS. 1 through 5 shows a device for feeding can barrels according to an embodiment of the present invention. The device generally includes a supply path 1, a rotary disk 2, attracting units 3, a conveyor path 4, a holder 5, and a retarder 6.

The supply path 1 supplies cylindrical metallic can barrels 7 with bottoms 7a one by one to the holder 5 in a direction normal to sides 7b of the can barrels 7 while holding the axes of the can barrels 7 horizontally. The supply path 1 has a star wheel 9 at its lower terminal end, the star wheel 9 being intermittently rotatable about its own axis in response to an extension of a piston rod 8a of an air cylinder 8 disposed on one side of the supply path 1 near the terminal end thereof. The star wheel 9 has a plurality of round recesses 9a defined in the outer periphery thereof at regular angular intervals, the round recesses 9a being of a shape complementary to that of the side 7b of the can barrel 7. When the star wheel 9 is intermittently rotated, the supply path 1 intermittently supplies can barrels 7, one at a time, to the holder 5 in synchronism with the attracting units 3 which are successively brought up to the holder 5 in response to rotation of the rotary disk 2.

The rotary disk 2 is positioned near the terminal end of the supply path 1 and is intermittently rotated about its own axis at a constant speed counterclockwise in the direction of the arrow A. The rotary disk 2 is rotated by a shaft having a timing cam which operates to generate signals for actuating the air cylinder 8, a solenoid-operated valve 17, and a paint coating device.

Figure 2:
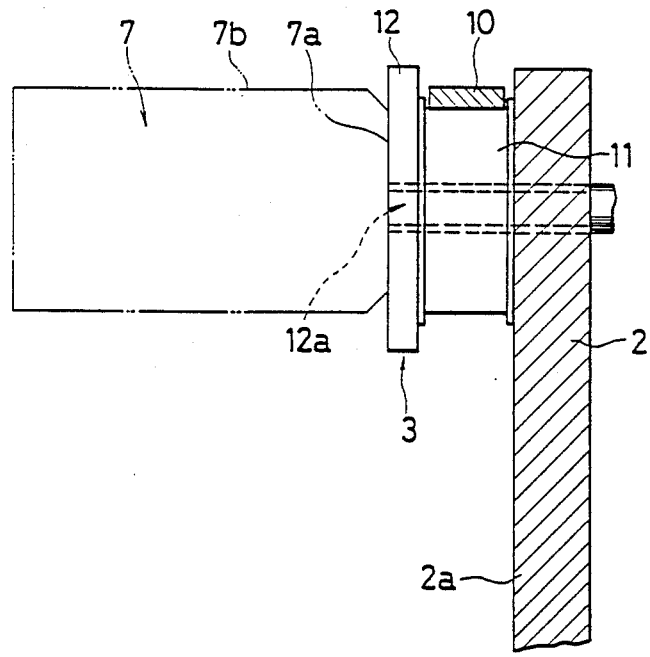
FIG. 2 is a cross-sectional view taken along line II—II of FIG. 1.

The attracting units 3 are disposed on the peripheral edge of a front surface of the rotary disk 2 lying vertically, the attracting units 3 being spaced in the circumferential direction of the rotary disk 2. Each of the attracting units 3 attracts the bottom 7a of one can barrel 7 supplied from the supply path 1, holds the can barrel 7 with its axis horizontally, and then rotates the can barrel 7 counterclockwise in the direction of the arrow B. As shown in FIG. 2, the attracting unit 3 comprises a rotatable drive roll 11 held against an endless belt 10 trained around the attracting units 3 and an attracting plate 12 disposed on one side of the drive roll 11 remotely from the rotary disk 2 and having a suction hole 12a defined therein at its center of rotation. The drive roll 11 and the attracting plate 12 are rotated in the direction of the arrow B by the belt 10. The bottom 7a of the can barrel 7a is attracted horizontally to the attracting plate 12 under a vacuum applied through the suction hole 12a by a vacuum chamber (not shown) connected to a suction pump located on the back of the rotary disk 2. After the can barrel 7 is angularly moved from the supply path 1 to the conveyor path 4 by the rotary disk 2, the attracting unit 3 releases the can barrel 7 onto the conveyor path 4.

The conveyor path 4 delivers the can barrel 7 released horizontally from the attracting unit 3 in a feeding direction C (FIG. 1). The conveyor path 4 comprises a support plate 13 for supporting and guiding the can barrel 7 and an endless belt conveyor 14 having a plurality of equally spaced suction holes 14b defined in a conveyor surface 14a thereof. The conveyor surface 14a extends parallel to the radial direction of the can barrel 7 as it lies horizontally. The bottom 7a of the can barrel 7 is attracted to the conveyor surface 14a under a vacuum applied through the suction hole 14b by a vacuum chamber (not shown) connected to a suction pump located on the back of the conveyor 14, while the can barrel 7 is fed in the direction of the arrow C by the conveyor 14.

Figure 3:
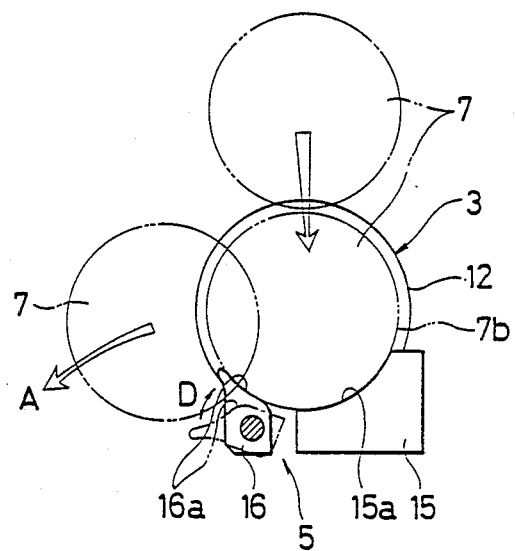
FIG. 3 is a view explaining how a can barrel holder operates.
Figure 4:
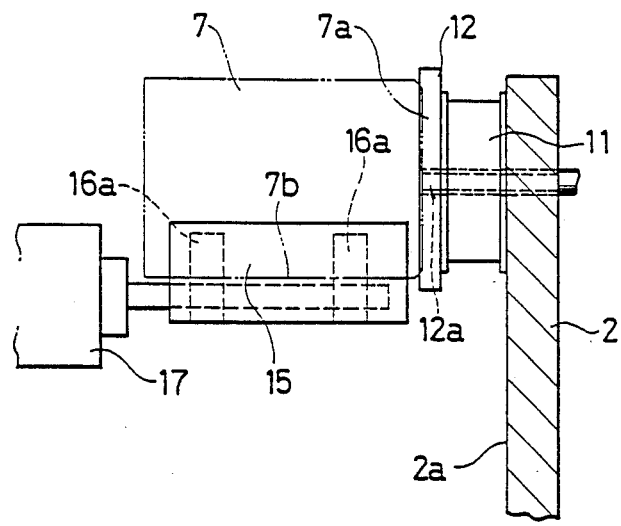
FIG. 4 is a cross-sectional view taken along line IV—IV of FIG. 1.

The holder 5 is disposed in confronting relation to the attracting unit 3 which is brought to the position below the supply path 1 by the rotary disk 2. The holder 5 serves to hold the can barrel 7 supplied horizontally from the supply path 1. When an attracting unit 3 is angularly moved by the rotary disk 2 to the position facing the holder 5, the attracting unit 3 is actuated to attract the bottom 7a of the can barrel 7 against the attracting unit 3. As illustrated in FIGS. 1 and 3, the holder 5 comprises a first holder member 15 disposed below the star wheel 9 and extending parallel to the longitudinal direction of the can barrel 7 as it lies horizontally. The first holder member 15 includes a round recess 15a complementary in shape to the side 7b of the can barrel 7, and a second holder member 16 located in opposite relation to the recess 15a of the first holder member 15 and swingable laterally and vertically in the direction of the arrow D (FIG. 3). The second holder member 16 includes an arcuate end arm 16a. The first and second holder members 15, 16 are brought to a "closed" position by angularly moving the arcuate end arm 16a to the solid-line position shown in FIG. 3. When in the closed position, the first and second holder members 15, 16 hold the can barrel 7 horizontally as it is supplied from the supply path 1 by the star wheel 9, while aligning the center of the bottom 7a of the can barrel 7 with an angular position to be taken by the suction hole 12a of the attracting plate 12. Thereafter, the attracting unit 3 is brought in the direction of the arrow A into confronting relation to the bottom 7a of the can barrel 7 held horizontally by the first and second holder members 15, 16, and is then operated to attract the can barrel 7. Subsequently, the solenoid-operated valve 17 is actuated to swing the end arm 16a to the left as indicated by the imaginary lines in FIG. 3 to bring the first and second holder members 15, 16 into an "open" position. Then, the can barrel 7 as it is held by the corresponding attracting unit 3 is rotated in the direction of the arrow A by the rotary disk 2. While the can barrel 7 is being held horizontally by the attracting unit 3, the inner surfaces of the can barrel 7 are coated with a paint layer by the paint coating device at each of positions S1, S2 (FIG. 1). The can barrel 7 may be coated with a single paint layer or more paint layers dependent on the material to be contained therein.

The attracting unit 3 is subsequently moved through a certain angle in the direction of the arrow A by the rotary disk 2 for releasing the can barrel 7.

Figure 5:
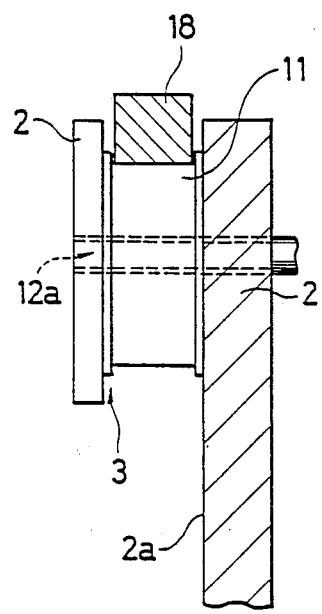
FIG. 5 is a cross-sectional view taken along line V—V of FIG. 1.

The retarder 6 serves to retard the attracting unit 3 against rotation after it has released the can barrel 7. As illustrated in FIGS. 1 and 5, the retarder 6 extends along a passage of movement of the attracting unit 3 after it has released the can barrel 7. The retarder 6 has a retarder member 18 which can be pressed against the drive roll 11 of the attracting unit 3. After the attracting unit 3 has released the can barrel 7, the retarder member 18 is pressed against the drive roll 11 of the attracting unit 3 as it is angularly moved by the rotary disk 2, for thereby retarding the attracting unit 3 against rotation about its own axis until it attracts a new can barrel 7.

Operation of the can barrel feeding device is as follows: A can barrel 7 is intermittently supplied from the supply path 1 by the star wheel 9 to the holder 5 where the can barrel 7 is held horizontally and centered by the first and second holder members 15, 16. When the attracting plate 12 of an attracting unit 3 retarded by the retarder 6 is brought into confronting relation to the bottom 7a of the can barrel 7, a vacuum is applied through the suction hole 12a of the suction plate 12 to attract the bottom 7a of the can barrel 7. Then, the second holder member 16 of the holder 5 is angularly moved to the open position, whereupon the can barrel 7 is angularly moved in the direction of the arrow A by the rotary disk 2 while the can barrel 7 held horizontally by the attracting unit 3 is rotated about its own axis by the attracting unit 3. When the rotary disk 2 has turned through a certain angle, the can barrel 7 is released from the attracting unit 3 so that it can be delivered from the rotary disk 2 onto the conveyor path 4. Since the can barrel 7, after having been held by the holder 5, is attracted to the attracting unit 3 which remains still, the can barrel 7 can concentrically be attracted to the attracting unit 3 in timed relation to the supply of the can barrel 7 from the supply path 1 to the rotary disk 2. The can barrel 7 is not caused to wobble when it is attracted to the attracting unit 3, and hence the side b and open end thereof are prevented from being damaged. The bottom 7a of the can barrel 7 can quickly be attracted to the attracting unit 3 which is brought into position by the rotary disk 2.

After the can barrel 7 has been released from the attracting unit 3 and delivered onto the conveyor path 4, the attracting unit 3 is prevented from rotating by the retarder 6. Accordingly, the attracting unit 3 as it is stopped against rotation can confront the bottom 7a of a next can barrel 7 which has been held horizontally by the holder 5. Thus the attracting unit 3 can quickly and reliably attract the bottom 7a of the next can barrel 7.

While in the illustrated embodiment the can barrel 7 is attracted by the attracting unit 3 under a vacuum, it may be magnetically attracted by an electromagnet device disposed on the back of the attracting unit 3 insofar as the can barrel 7 is made of a steel material such as tin plate or tin-free steel.

Figure 6:
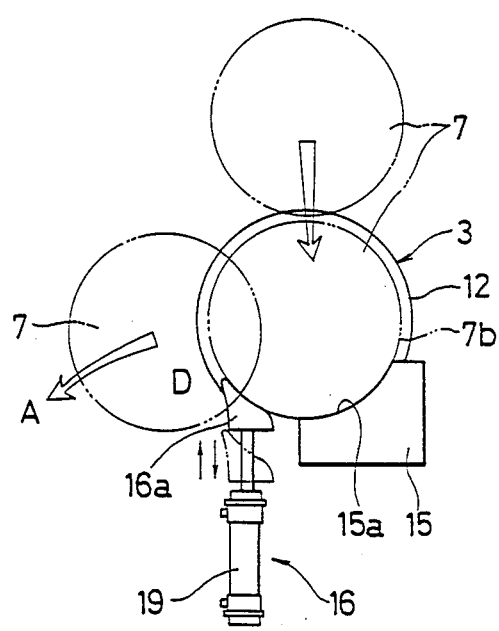
FIG. 6 is a view explaining operation of a modified can barrel holder.
Figure 7:
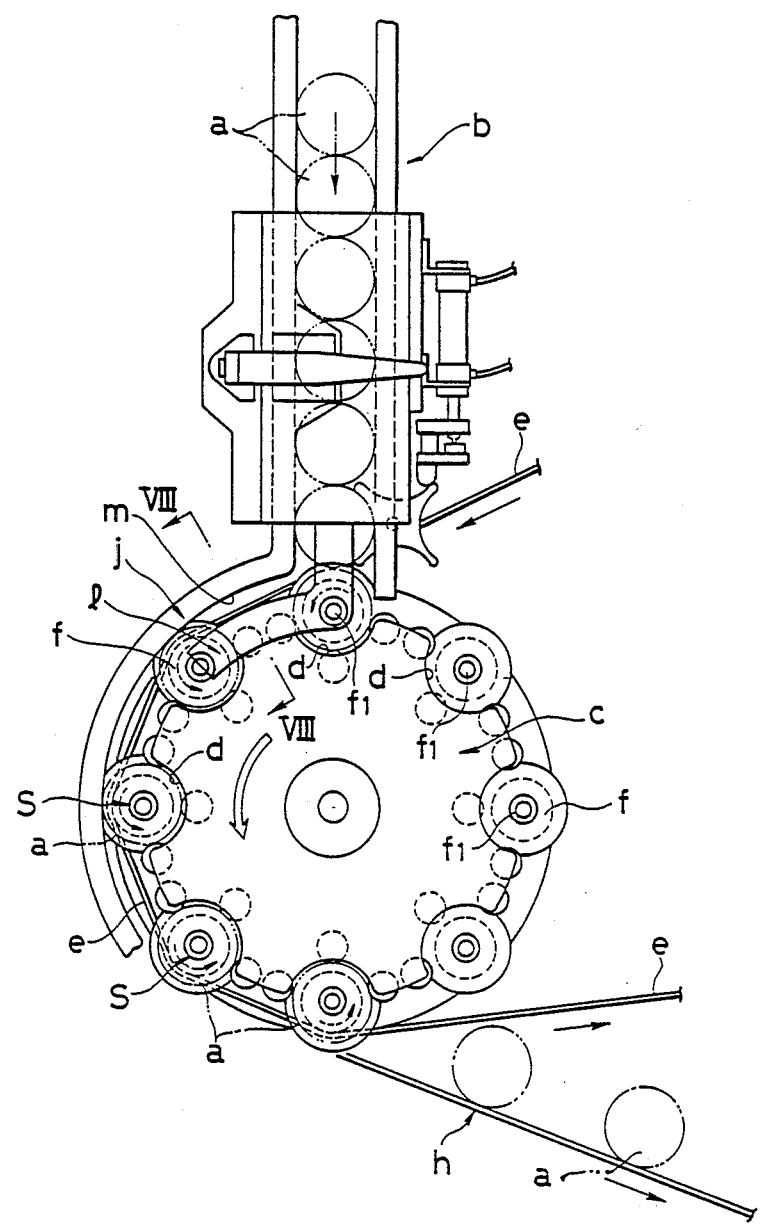
FIG. 7 is a front elevational view of a conventional can barrel feeding device.
Figure 8:
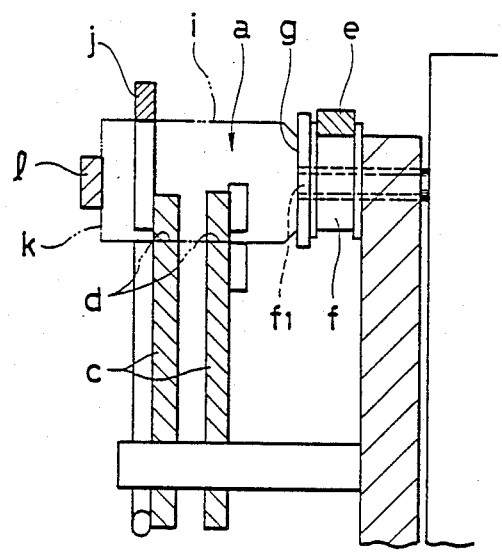
FIG. 8 is a cross-sectional view taken along line VIII—VIII of FIG. 7.

In the above illustrated embodiment, the end arm 16a of the second holder member 16 is swingable laterally. However, as shown in FIG. 6, the end arm 16a of the second holder member 16 may be vertically moved by a cylinder unit 19. When the end arm 16a is elevated, the first and second holder members 15, 16 are brought together to hold a can barrel 7 horizontally, and when the end ar 16a is lowered, the first and second holder members 15, 16 are spaced apart from each other to allow the can barrel 7 to move with the rotary disk 2 in the direction of the arrow A.

With the present invention, after a can barrel has been supplied from the supply path, it is held horizontally by the holder with the bottom of the can barrel being centrally aligned with the center of rotation of the attracting unit. Thereafter, the can barrel is attracted to the attracting unit which has been stopped by the retarder against rotation about its own axis. Accordingly, the can barrel can be attracted to the attracting unit reliably in timed relation to the supply of the can barrel from the supply path to the rotary disk without damaging the can barrel. The can barre feeding device is simple in structure as it does not require a star wheel for rotating can barrels, a side guide for engaging can barrels, and a top guide for engaging the open ends of can barrels.

Although certain preferred embodiments have been shown and described, it should be understood that many changes and modifications may be made therein without departing from the scope of the appended claims.

What is claimed is:

1. A deice for feeding can barrels, comprising:
   a rotary member rotatable about its own axis;
   supply path means for supplying an barrels to said rotary member;
   a plurality of rotatable attracting units mounted on said rotary member each attracting the bottom of one of the can barrels supplied from a supply path in a first position, each of said attracting units being inactivatable to release said one can barrel onto a conveyor path in a second position after said one can barrel has been rotated by said rotary member through a prescribed angle from said first position to said second position;
   drive means operatively connected for imparting rotation to said attracting units and intermittent rotation to said rotary member;
   a holder disposed in said first position for holding the can barrels, one at a time, supplied from said supply path means while centrally aligning the bottom of the can barrel with the center of rotation of the attracting unit in said first position; and
   a retarder for stopping the attracting unit against rotation about its own axis when said attracting unit is moved into said first position and attracts the can barrel held by said holder;
   said holder including support means for supporting a side of said can barrel in said first position and releasing means for releasing said can barrel when the can barrel with the bottom thereof attracted by said attracting unit is rotated from said first position by said rotary member.

2. A device according to claim 1, wherein said attracting units comprise a plurality of respective rotatable attracting plates spaced in a circumferential direction of said rotary member, and further including drive means for driving predetermined attracting plates to rotate about their own axes when the attracting plates are moved from said first position through said prescribed angle.

3. A device according to claim 2, wherein each of said attracting plates of the attracting units has a suction hole defined therein at the center of rotation thereof for attracting the can barrel under a vacuum.

4. A device according to claim 2, wherein each of said attracting units comprises a magnet device disposed on said attracting plate for magnetically attracting the can barrel.

5. A device according to claim 1, wherein said support means comprises a pair of holder members, one of said holder members being movable to allow rotation of said can barrel from said first position.

6. A device according to claim 1, wherein said retarder comprises means for stopping the attracting unit against rotation before the attracting unit is moved to said first position by said rotary member.

7. A device according to claim 1, further including drive means for driving predetermined attracting plates to rotate about their own axes when the attracting plates are moved from said first position through said prescribed angle, said retarder comprises means for stopping the attracting unit against rotation after the attracting unit has stopped being driven by said drive means.

* * * * *